J. NOLL.

TRACK CONSTRUCTION AND RAIL CLIP.

APPLICATION FILED JUNE 15, 1912.

Reissued July 30, 1912.

13,452.

Witnesses:
Edwin A. Packard.
Marjorie Rollins

Inventor
John Noll
By his Attorneys
Kidder Wendell & Thorgerson

UNITED STATES PATENT OFFICE.

JOHN NOLL, OF NEW YORK, N. Y., ASSIGNOR TO CONTINUOUS RAIL COMPANY, OF WILMINGTON, DELAWARE, A CORPORATION OF DELAWARE.

TRACK CONSTRUCTION AND RAIL-CLIP.

13,452. Specification of Reissued Letters Patent. Reissued July 30, 1912.

Original No. 1,026,877, dated May 21, 1912, Serial No. 676,134. Application for reissue filed June 15, 1912. Serial No. 703,982.

*To all whom it may concern:*

Be it known that I, JOHN NOLL, a citizen of the United States, and a resident of the borough of Brooklyn, in the city of New York, county of Kings, and State of New York, have invented certain new and useful Improvements in Track Construction and Rail-Clips, of which the following is a specification.

The invention relates to a track construction comprising rails supported on transverse members and held in place on said members by holding means which are adapted to secure the rail in several different positions on the transverse member.

The invention also relates to a track construction comprising flanged supporting members which extend transversely of the rail and which transverse members are provided with slotted portions extending longitudinally thereof to receive bolts and depending hooks for rail securing means.

The invention furthermore relates to a clip for securing a rail to a supporting member.

Figure 1:
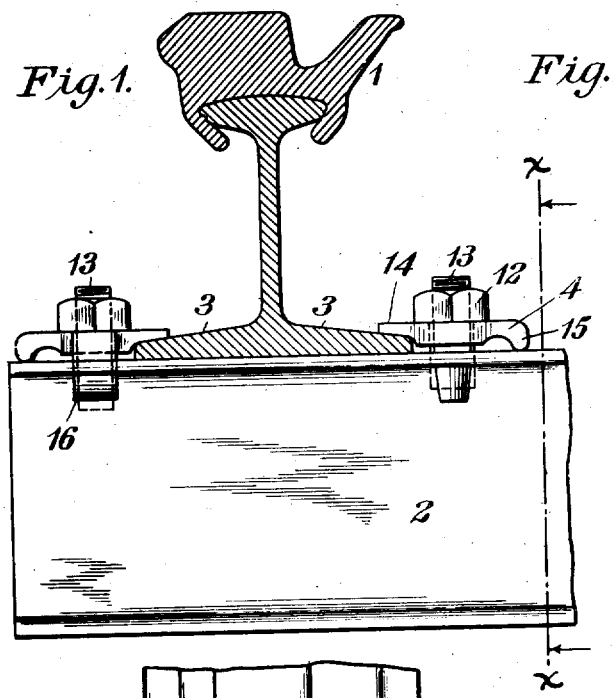
Figure 2:
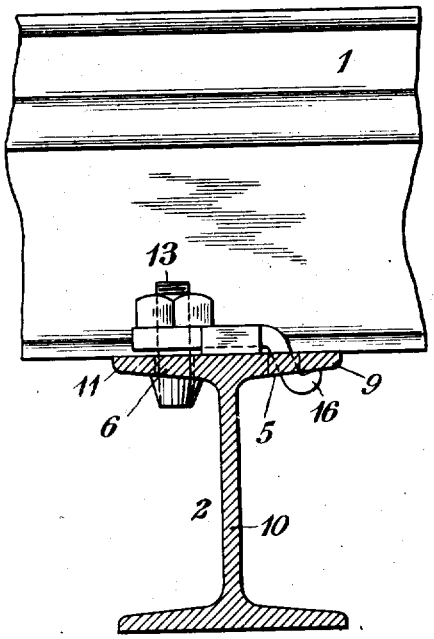
Figure 3:
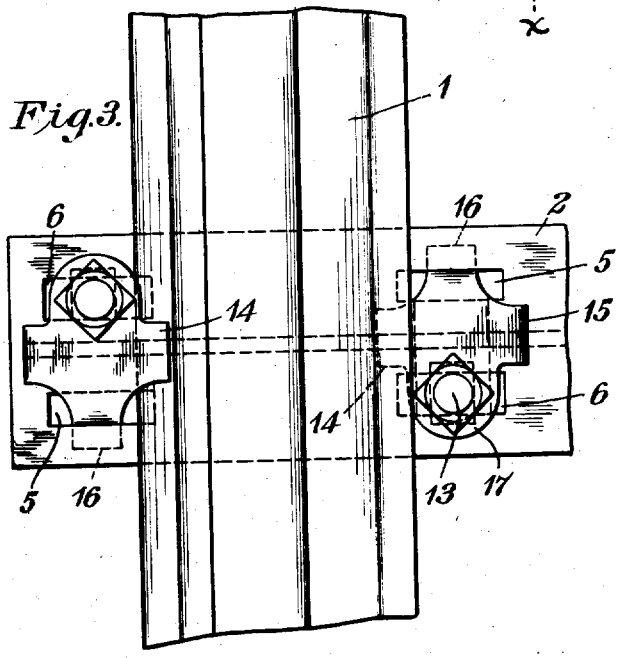
Figure 4:
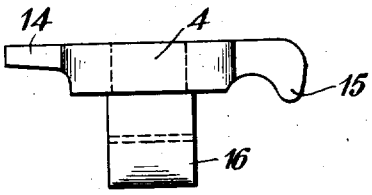
Figure 5:
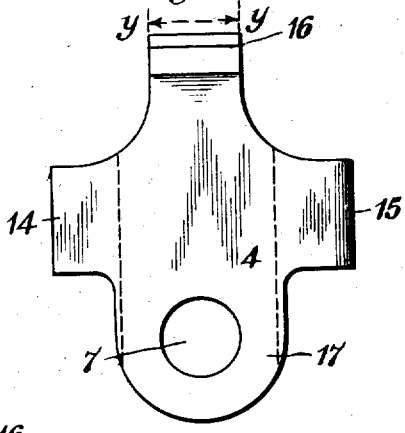
Figure 6:
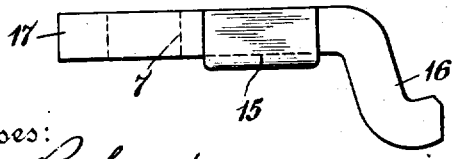

As showing a specific embodiment of the invention, reference is made to the drawings in which:

Figure 1 is a view showing a transverse section of a rail held in position on its supporting member. Fig. 2 is a view taken on the line $x$—$x$ of Fig. 1 looking in the direction of the arrows. Fig. 3 is a plan view showing the rail held in position on the transverse member. Figs. 4, 5 and 6 are respectively side plan and end views of the clip which holds the rail in position on its supporting member.

The rail 1 extends longitudinally of the track and is supported by a series of members 2 which extend transversely to both the rails and the track. The rails are provided with the usual supporting flanges 3—3 which may rest directly upon the supporting member 2 and there is provided holding means which engage both the supporting flanges of the rail and the transverse members and secure the rails in proper position upon the transverse supporting members.

From an inspection of Figs. 2 and 3 it will be seen that in the supporting member 2 there is a pair of slotted portions 5—6 and 5—6 on each side of the rail. These slotted portions extend transversely to the rail or longitudinally of the supporting member 2. Where the supporting member is a flanged section as is shown in Fig. 2, it is preferable to locate the slotted portions of each pair on opposite sides of the web and it will be noted that in said Fig. 2 the slot 5 is located in the flange 9 at one side of the web 10 and that the slot 6 is located in the flange 11 at the other side of the web.

The means for holding the rail in position on the supporting member comprises the clip 4, the nut 12 and the bolt 13. The rail clip shown in detail in Figs. 4 to 6 is provided at one end thereof with a beveled rail engaging and holding portion 14, at the other end thereof with a depending portion 15 which engages the top of the supporting member 2, at one side thereof with a depending hook 16, and at the other side thereof with the bolt receiving portion 17 provided with the bolt hole 7. When in holding position the depending hook 16 passes through the slot 5 and engages the under side of the flange in which the slot is located. Also when the clip is in place the bolt hole 7 is located over the companion slot 6 whereby the bolt 13 may pass through both the slot 6 of the base member and the bolt opening 7 of the clip.

As the diameter of the bolt is less than the length of the slot 6 or 7 and as the length of the depending hook, namely, the dimension taken on the line $y$—$y$ is less than the length of the slot 5, it will be apparent that the holding means comprising the clip and bolt can occupy several different positions whereby the rail can be secured in different positions on the transverse member.

The depending hook and the bolt receiving portion of the clip are located upon opposite sides of the clip and also upon opposite sides of any line passing through the rail engaging portion and the depending portion 15. Due to this construction, the clip can operate as a lever fulcrumed on the depending hook at the side so that when the bolt 13 is tightened the ends 14 and 15 of the clip will be forced downwardly against respectively the rail and transverse member and so that the bolt and hook will both draw upwardly on the under side of the flanges of the transverse member, thus serving as a means to firmly secure the rail and transverse member in place.

It is obvious that various forms and modifications may be made without departing from the spirit and scope of the invention.

I claim as my invention:

1. In a track construction the combination of transversely extending rail supporting members, flanged rails supported thereupon and means for adjustably securing the rails to the transverse members, the transverse members having upon opposite sides of each rail a pair of slots extending transversely to the rail, the means for adjustably securing the rails comprising a bolt and a rail clip having at one end a rail engaging and holding portion, at the other end a depending portion to engage the top of the transverse member, at one side a depending hook passing through one of the slots so that an upper surface of the hook always presses upwardly against the rail supporting member and at the other side a bolt receiving portion arranged so that the bolt projecting from the other slot of the pair of slots through the bolt receiving portion of the clip when tightened will swing the depending hook portion of the clip upwardly against the supporting member around an axis passing between the rail engaging portion and depending portion at the opposite end of the clip.

2. In a track construction the combination of a transversely extending supporting member, a rail supported thereupon and means upon opposite sides of the rail for adjustably securing the rail to the transverse member, the transverse member having upon opposite sides of the rail a pair of slots extending transversely to the rail, the means for adjustably securing the rail comprising a bolt and a rail clip having at one end a rail engaging and holding portion, at the other end a portion to engage the top of the transverse member, at one side a depending hook passing through one of the slots and at the other side a bolt receiving portion arranged so that the bolt projecting from the other slot will enter the bolt receiving portion of the clip whereby when the bolt is tightened the depending hook portion of the clip will be forced upwardly and the ends of the clip will be drawn downwardly against the rail and the transverse member, the slots, the bolt and the depending hook of the clip being so shaped and proportioned that the rail can be held in different transverse positions on the supporting member.

3. The combination of a rail supporting member having a flanged top provided with a pair of slots extending transversely of the rail when in position on the member and a rail clip having at one side thereof a depending hook to enter one of the slots and engage the under portion of the flange of the supporting member, at the other side a bolt receiving opening located over the second slot when the clip is in position on the track member said clip having at one end a portion to engage the supporting flange of a rail to hold the rail and at the other end a depending portion to engage the top of the transverse member.

4. The combination of a rail supporting member, a rail clip and a bolt, the supporting member having a pair of slots extending lengthwise of the member and the rail clip having at one side thereof a depending hook, at the other side a bolt receiving portion, at one end thereof a rail engaging portion and at the other end a depending portion, the arrangement of the slots in the transverse member and the construction of the clip and bolts being such that the depending hook is adapted to enter one of the slots and the bolt is adapted to pass through the other of the slots into the bolt receiving portion of the clip whereby when the bolt is tightened the ends of the rail clip will be firmly drawn toward the transverse member so as to secure a rail thereupon.

5. A rail clip having at one end a rail engaging portion, at the other end a depending portion, at one side a depending hook and at the other side a bolt receiving portion.

6. A rail clip having at one end an inclined rail engaging portion, at the other end a depending portion, at one side a depending hook and at the other side a bolt receiving portion, the depending hook and the bolt receiving portion being located upon opposite sides of any line which can be passed through the inclined rail engaging portion and the depending portion at the end of the clip.

This specification signed and witnessed this 14th day of June, A. D., 1912.

JOHN NOLL.

In the presence of—
EUGENE DEL MAR,
EDWIN A. PACKARD.